US008385934B2

United States Patent
Choi

(10) Patent No.: US 8,385,934 B2
(45) Date of Patent: Feb. 26, 2013

(54) APPARATUS AND METHOD FOR ADAPTIVE AUDIO QUALITY CONTROL USING BLUETOOTH

(75) Inventor: Woo-Sung Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 354 days.

(21) Appl. No.: 12/686,808

(22) Filed: Jan. 13, 2010

(65) Prior Publication Data

US 2010/0178870 A1 Jul. 15, 2010

(30) Foreign Application Priority Data

Jan. 13, 2009 (KR) .................. 10-2009-0002523

(51) Int. Cl.
*H04W 72/00* (2009.01)
(52) U.S. Cl. ............... 455/452.2; 455/41.2; 455/67.13; 704/500
(58) Field of Classification Search .............. 455/452.2, 455/41.2, 67.13, 177.1, 200.1, 266; 704/500
See application file for complete search history.

(56) References Cited

U.S. PATENT DOCUMENTS

| 2006/0135076 | A1 | 6/2006 | Honkanen et al. | |
|---|---|---|---|---|
| 2008/0043705 | A1* | 2/2008 | Desai et al. | 370/346 |
| 2008/0287063 | A1* | 11/2008 | Kidron et al. | 455/41.2 |
| 2010/0066805 | A1* | 3/2010 | Tucker et al. | 348/14.08 |
| 2010/0066808 | A1* | 3/2010 | Tucker et al. | 348/14.09 |
| 2010/0097960 | A1* | 4/2010 | Amano | 370/260 |
| 2010/0227564 | A1* | 9/2010 | Kaneko | 455/66.1 |
| 2011/0176060 | A1* | 7/2011 | Lee et al. | 348/723 |
| 2012/0002059 | A1* | 1/2012 | Levy et al. | 348/192 |

* cited by examiner

*Primary Examiner* — Minh D Dao
(74) *Attorney, Agent, or Firm* — Jefferson IP Law, LLP

(57) ABSTRACT

An apparatus and a method for playing an audio in an audio player using Bluetooth are provided. The method for playing an audio in an audio player using Bluetooth includes determining an available resource status of the player, transmitting audio data with decreasing audio quality when it is determined that the available resource status is less than a reference value, and transmitting an audio data with increasing audio quality when it is determined that the available resource status is more than the reference value.

18 Claims, 2 Drawing Sheets

APPARATUS AND METHOD FOR ADAPTIVE AUDIO QUALITY CONTROL USING BLUETOOTH

PRIORITY

This application claims the benefit under 35 U.S.C. §119(a) of a Korean patent application filed in the Korean Intellectual Property Office on Jan. 13, 2009 and assigned Serial No. 10-2009-0002523, the entire disclosure of which is hereby incorporated by reference.

BACKGROUND OF THE INVENTION

1. Field of the Invention

The present invention relates to an apparatus and a method for adaptive audio quality control using Bluetooth. More particularly, the present invention relates to an apparatus and a method for adaptive audio quality control in order to improve a high quality audio transmission function of a Bluetooth Audio Visual (AV) profile.

2. Description of the Related Art

When a high quality audio is transmitted using Bluetooth, a constant compression ratio, controlled by software, is generally used and a constant quality audio, controlled by the software, is generally transmitted. More specifically, a compression ratio of a Sub Band Codec (SBC) encoder, which is used for compression of the high quality audio transmission, is fixed at a specific value.

However, when a wireless channel status degrades or when a resource status of an AV player degrades due to, for example, multitasking and the like, if a fixed compression ratio is used, the audio quality degrades due to a lack of available resources or a connection becomes unstable due to the poor wireless channel status.

Therefore, there is a need for an apparatus and method for adaptive audio quality control using Bluetooth in a multitasking environment.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for adaptive audio quality control using Bluetooth.

Another aspect of the present invention is to provide a method and an apparatus that is undisturbed from a lack of a resource or from a poor wireless channel status by controlling a compression ratio of a Sub Band Codec (SBC) encoder when transmitting an audio using Bluetooth.

In accordance with an aspect of the present invention, a method for playing an audio in an audio player using Bluetooth is provided. The method includes determining an available resource status of the player, transmitting an audio data with decreasing audio quality when it is determined that the available resource status is less than a reference value, and transmitting an audio data with increasing audio quality when it is determined that the available resource status is more than the reference value.

In accordance with another aspect of the present invention, an apparatus for playing an audio in an audio player using Bluetooth is provided. The apparatus includes a resource monitor for determining an available resource status of the player, and an audio quality controller for transmitting an audio data with decreasing audio quality when it is determined that the available resource status is less than a reference value and for transmitting an audio data with increasing audio quality when it is determined that the available resource status is more than the reference value.

In accordance with yet another aspect of the present invention, a method for playing an audio in an audio player using Bluetooth is provided. The method includes determining a resource status of the audio player, determining an audio transmission quality based on the determined resource status, and transmitting audio data using the determined transmission quality.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an apparatus and a method for adaptive audio quality control using Bluetooth will be explained.

Figure 1:
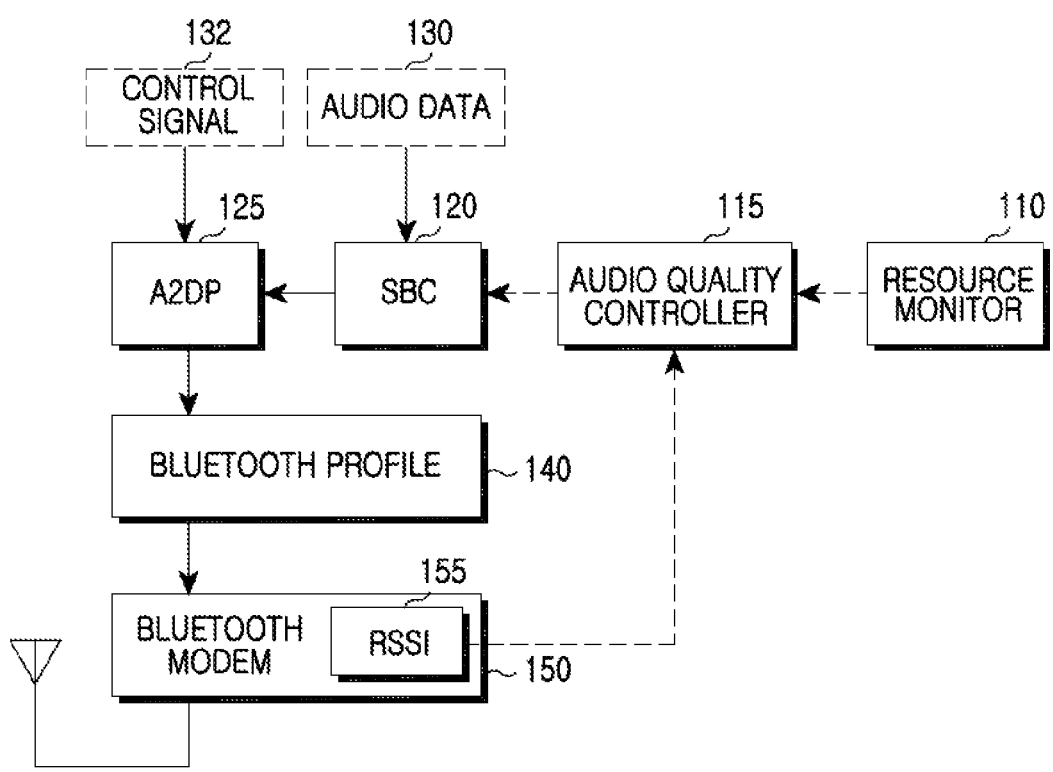
FIG. 1 illustrates a block diagram of an audio player with a Bluetooth according to an exemplary embodiment of the present invention; and, FIG. 2 is a flowchart illustrating a method of operating an audio player with a Bluetooth according to an exemplary embodiment of the present invention Throughout the drawings, like reference numerals will be understood to refer to like parts, components and structures

FIG. 1 illustrates a block diagram of an audio player with a Bluetooth according to an exemplary embodiment of the present invention.

Referring FIG. 1, the audio player comprises a resource monitor 110, an audio quality controller 115, a Sub Band Codec (SBC) 120, an Advanced Audio Distribution Profile (A2DP) 125, a Bluetooth profile 140 and a Bluetooth modem 150 including a Received Signal Strength Indicator (RSSI) 155.

When audio data 130 is to be transmitted (e.g., when an audio file is to be played) through a wireless channel, the resource monitor 110 determines a resource status and provides an indication of the resource status to the audio quality controller 115. In an exemplary implementation, the resource monitor 110 may provide an indication of a change in the resource status from an earlier determined resource status.

The audio quality controller 115 receives the indication of the resource status from the resource monitor 110, determines a compression ratio according to the resource status, and provides a control signal, which corresponds to the compression ratio, to the SBC 120.

The control signal, which is provided from the audio quality controller 115, may be determined based on the resource status or based on a change of the resource status. For example, if the resource monitor 110 determines that there are excess resources, the audio quality controller 115 may increase an audio quality. Similarly, if the resource monitor 110 determines that there are insufficient resources, the audio quality controller 115 may decrease an audio quality, and when the amount of resources is proper, the audio quality controller 115 may maintain an audio quality.

The control signal, which is provided from the audio quality controller 115, may be a control signal for instructing that the bit pool value be maintained, that the bit pool value be increased or that the bit pool value be decreased.

The SBC 120 may control the audio quality based on the bit pool value. That is, the SBC 120 may vary the type or rate of encoding used on the audio data 130 depending on the bit pool value. When the bit pool value decreases, the audio quality is reduced and data flow is also decreased. On the contrary, when the bit pool value increases, the audio quality becomes better and data flow is also increased.

The audio quality controller 115 controls the bit pool value and controls a balance between the audio quality and the amount of resources used. The resources considered may be any resource in the player (e.g., a CPU use status of the player, a buffer status of the SBC 120, an entire memory status, a wireless channel status, etc.) according to an implementation.

Data that is provided from the SBC 120 passes through the A2DP 125 and is transmitted through the Bluetooth modem 150 according to a profile processing in the Bluetooth profile 140. The A2DP 125 may receive a control signal 132 from another control block (not shown) or from the SBC 120. The A2DP 125 supports the Bluetooth profile 140 for processing audio data according to the control signal 132.

An RSSI value is determined in the RSSI 155 and is provided to the audio quality controller 115. The audio quality controller 115 may determine an audio quality based on the RSSI value that is provided from the RSSI 155.

That is, when the RSSI value denotes that the wireless channel status is poor, the audio quality controller 115 may decrease a bit pool value. On the other hand, when the RSSI value denotes that the wireless channel status is good, the audio quality controller 115 may increase a bit pool value.

In the multi-taking environment, several functions may be executed simultaneously so that the resource status determination is important. That is, it is important to consider the required resource demands of the several functions in order to support successful function execution. In consideration of the resource status, the SBC 120 generally uses so many CPU resources that playing of an audio may be interrupted when there are insufficient CPU resources of the player.

If the resource monitor 110 monitors a CPU resource status and if the audio quality controller 115 controls a compression ratio, the audio quality controller 115 may decrease the audio quality if it is determined that the CPU environment uses many CPU resources such as in a multi-tasking environment. Alternatively, the audio quality controller 115 may increase the audio quality if it is determined that the CPU environment does not use many resources, for example when the audio is played alone.

When the wireless channel status is considered, the RSSI value of a Bluetooth channel is determined in the RSSI 155 and the audio quality controller 115 controls the compression ratio based on the RSSI value.

More specifically, the audio quality controller 115 increases the audio quality when the RSSI value indicates that the wireless channel status is good and the audio quality controller 115 decreases the audio quality when the RSSI value indicates that the wireless channel status is poor.

The audio quality controller 115 may control the audio quality based on all resources in the player or may control the audio quality based on specific resources in the player.

A reference value that is used for the audio quality may be determined as specific percent of an entire CPU resource (e.g., 60% of the entire CPU resource) or may be determined on a stage by stage basis (e.g., 30%, 60% or 90%) of the entire CPU resource, in order to control the audio quality.

Also, the reference value that is used for the audio quality may be determined as an average value over some duration of time. When the RSSI value of the Bluetooth channel is used as a reference value, the reference value may be a determined threshold value or may be determined stage by stage.

Figure 2:
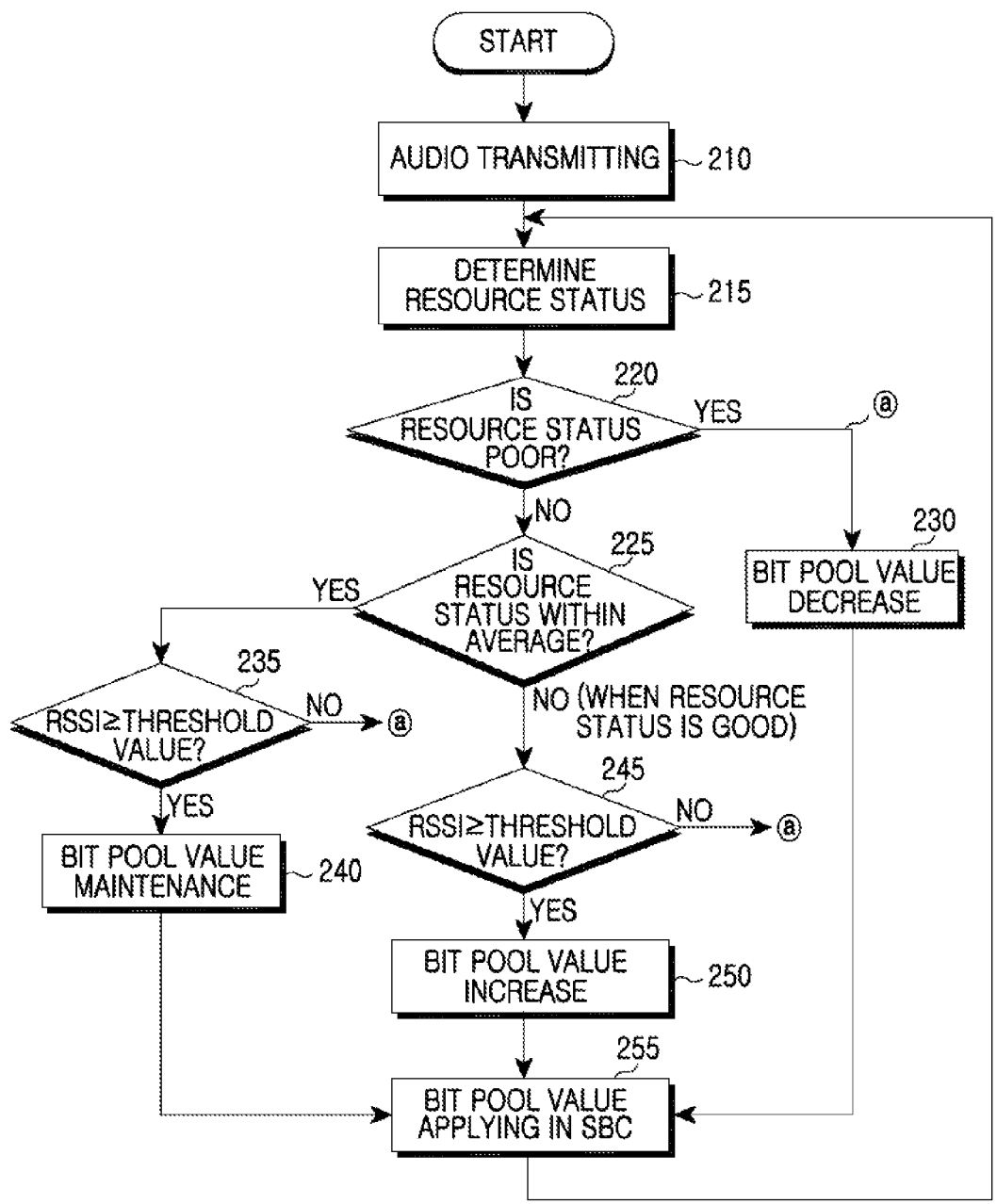

FIG. 2 is a flowchart illustrating a method of operating an audio player with a Bluetooth according to an exemplary embodiment of the present invention.

Referring to FIG. 2, an audio is played and transmitted by the player in step 210. In step 215, a resource status is determined. For example, a resource monitor monitors a resource status and an RSSI monitors a wireless channel status in step 215.

In step 220, it is determined if the resource status is poor. When it is determined in step 220 that the resource status is poor, the resource monitor notifies an audio quality controller of the resource status and the audio quality controller determines to decrease a bit pool value based on the resource status in step 230. Furthermore, the audio quality controller transmits a control signal which denotes the bit pool value decrease to the SBC.

When the SBC receives the control signal, the SBC decreases the bit pool value based on the control signal in step 255.

The above steps denote determining whether the resource status is good or poor and denote decreasing the audio quality when the resource status is poor.

On the other hand, when it is determined in step 220 that the resource status is not poor, it is determined if the resource status is within an average in step 225. If it is determined in step 225 that the resource status is within the average, it is determined if an RSSI value is less than a threshold value in step 235. If it is determined in step 235 that the RSSI value is less than the threshold value, the resource monitor notifies the audio quality controller of the resource status and the RSSI notifies the audio quality controller of the determined RSSI value.

The audio quality controller determines to decrease the bit pool value based on the resource status and the wireless channel status in step 230 and the audio quality controller transmits a control signal which denotes the bit pool value decrease to the SBC.

When the SBC receives the control signal which denotes the bit pool value decrease, the SBC decreases the bit pool value based on the control signal in step 255.

The above steps denote decreasing the audio quality because the wireless channel status is poor.

When it is determined in step 225 that the resource status is within an average, and when it is determined in step 235 that a determined RSSI value is equal to or greater than the threshold value, the resource monitor notifies the audio quality controller of the resource status and the RSSI notifies the audio quality controller of the determined RSSI value.

The audio quality controller determines to maintain the bit pool value based on the resource status and the wireless channel status in step 240 and the audio quality controller transmits a control signal which denotes maintaining the bit pool value to the SBC.

When the SBC receives the control signal which denotes the bit pool value maintenance, the SBC maintains the bit pool value based on the control signal in step 255.

The above steps denote maintaining the audio quality because the resource status is within the average and the wireless channel status is good.

When it is determined in step 225 that the resource status is not within an average, it is determined in step 245 if the RSSI value is greater than or equal to a threshold value. If it is determined in step 245 that the RSSI value is equal to or greater than the threshold value, the resource monitor notifies the audio quality controller of the resource status and the RSSI notifies the audio quality controller of the determined RSSI value.

The audio quality controller determines to increase the bit pool value based on the resource status and the wireless channel status in step 250 and the audio quality controller transmits a control signal which denotes the bit pool value increase to the SBC.

When the SBC receives the control signal which denotes the bit pool value increase, the SBC increases the bit pool value based on the control signal in step 255.

The above steps denote increasing the audio quality because the resource status and the wireless channel status are good.

When it is determined in step 225 that the resource status is not within an average, and when it is determined in step 245 that a determined RSSI value is less than a threshold value, the resource monitor notifies the audio quality controller of the resource status and the RSSI notifies the audio quality controller of the determined RSSI value.

The audio quality controller determines to decrease the bit pool value based on the resource status and the wireless channel status in step 230 and the audio quality controller transmits a control signal which denotes the bit pool value decrease to the SBC.

When the SBC receives the control signal which denotes the bit pool value decrease, the SBC decreases the bit pool value based on the control signal in step 255.

The above steps denote decreasing the audio quality because the wireless channel status is poor. Hereafter, an algorithm is finished according to an exemplary embodiment of the present invention.

In an exemplary algorithm, the average of the resource status may be used to determine whether the resource status is good or poor. Herein, the average may be an available average. Also, the threshold value may be determined according to a simulation, an implementation, and the like.

Exemplary embodiments of the present invention change the compression ratio of the SBC so that playing of an audio or an audio transmission does not disturb other processes when the resource status or the wireless channel status is poor.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for playing an audio in an audio player using Bluetooth, the method comprising:
   determining an available resource status of the player;
   transmitting audio data with a decreased bit pool value of a Sub Band Codec (SBC) when it is determined that the available resource status is less than a reference value; and
   transmitting audio data with an increased bit pool value of the SBC when it is determined that the available resource status is greater than the reference value.

2. The method of claim 1, further comprising:
   transmitting audio data with maintained audio quality when it is determined that the available resource status is equal to the reference value.

3. The method of claim 1, wherein the determining of the available resource status comprises determining a specific usage percent of an entire Central Processing Unit (CPU).

4. The method of claim 1, further comprising:
   transmitting audio data with the decreased bit pool value when a wireless channel status is less than a threshold value.

5. The method of claim 4, wherein the wireless channel status is determined by a Received Signal Strength Indication (RSSI) value.

6. The method of claim 1, further comprising:
   transmitting audio data with the increased bit pool value when a wireless channel status is greater than a threshold value.

7. The method of claim 6, wherein the wireless channel status is determined by a Received Signal Strength Indication (RSSI) value.

8. An apparatus for playing an audio in an audio player using Bluetooth, the apparatus comprising:
   a resource monitor for determining an available resource status of the player; and
   an audio quality controller for transmitting an audio data with a decreased bit pool value of a Sub Band Codec (SBC) when it is determined that the available resource status is less than a reference value and for transmitting an audio data with an increased bit pool value of the SBC when it is determined that the available resource status is more than the reference value.

9. The apparatus of claim 8, wherein the audio quality controller transmits audio data with maintained audio quality when it is determined that the available resource status is equal to the reference value.

10. The apparatus of claim 8, wherein the resource monitor determines the available resource status as a specific usage percent of an entire Central Processing Unit (CPU).

11. The apparatus of claim 8, wherein the audio quality controller transmits audio data with the decreased bit pool value of the SBC when a wireless channel status is less than a threshold value.

12. The apparatus of claim 11, wherein the wireless channel status is determined by a Received Signal Strength Indication (RSSI) value.

13. The apparatus of claim 8, wherein the audio quality controller transmits audio data with the increased bit pool value of the SBC when a wireless channel status is greater than a threshold value.

14. The apparatus of claim 13, wherein the wireless channel status is determined by a Received Signal Strength Indication (RSSI) value.

15. A method for playing an audio in an audio player using Bluetooth, the method comprising:
    determining a resource status of the audio player;
    determining a bit pool value of a Sub Band Codec (SBC) based on the determined resource status; and
    transmitting audio data using the determined bit pool value.

16. The method of claim 15, wherein the determining of the bit pool value based on the determined resource status comprises:
    increasing the bit pool value if the determined resource status indicates excess resources are available;
    decreasing the bit pool value if the determined resource status indicates insufficient resources are available; and
    maintaining the bit pool value if the determined resource status indicates sufficient resources are available.

17. The method of claim 15, wherein the determining of the resource status comprises determining a change of available resources from a previously determined value.

18. The method of claim 15, wherein the determining of the resource status of the audio player comprises determining at least one of an available amount of processing resources of the audio player and a channel status of the audio player.

* * * * *